(12) United States Patent
Halvorson et al.

(10) Patent No.: US 6,311,746 B1
(45) Date of Patent: Nov. 6, 2001

(54) CIRCULAR SAW HEAD

(75) Inventors: David J. Halvorson; Travis A. Anderson, both of Seguin, TX (US)

(73) Assignee: Alamo Group Inc., Seguin, TX (US)

( * ) Notice: Subject to any disclaimer, the term of this patent is extended or adjusted under 35 U.S.C. 154(b) by 0 days.

(21) Appl. No.: 09/633,706

(22) Filed: Aug. 7, 2000

(51) Int. Cl.$^7$ .................................................. A01G 23/095
(52) U.S. Cl. .................. 144/24.13; 56/17.4; 56/235; 56/10.1; 144/41.1; 144/251.1; 144/335; 144/343
(58) Field of Search .................. 37/302; 56/15.2, 56/17.1, 17.4, 17.5, 10.1, 11.9, 295, 235; 83/928; 30/276, 286, 347; 144/4.1, 24.13, 34.1, 251.1, 335, 343

(56) References Cited

U.S. PATENT DOCUMENTS

| | | | |
|---|---|---|---|
| 3,138,911 | * 6/1964 | Pounds | 56/235 |
| 4,302,922 | * 12/1981 | Guerndt, Jr. et al. | 56/235 |
| 4,815,263 | * 3/1989 | Hartung et al. | 144/24.13 X |
| 5,144,748 | * 9/1992 | Hult | 144/34.1 X |
| 5,408,814 | * 4/1995 | Milbourn | 56/17.4 X |
| 5,501,257 | * 3/1996 | Hickman | 144/34.1 |

* cited by examiner

Primary Examiner—W. Donald Bray
(74) Attorney, Agent, or Firm—Gunn, Lee & Keeling; Michelle Evans

(57) ABSTRACT

A circular saw head for use as a boom mounted head attachment is disclosed for agricultural trimming. The blades can cut as much as four inches of material. An adjustable head piece is provided that is also reversible allowing for exposure of more or less of the blades. Safety aprons are provided to deflect cut material away from the operator.

9 Claims, 3 Drawing Sheets

CIRCULAR SAW HEAD

BACKGROUND OF THE INVENTION

1. Field of the Invention

Applicant's invention relates to a circular saw head for cutting tree limbs which can be used as a boom mounted head attachment.

2. Background Information

Agricultural trimming devices which attach to tractors are useful in groves and orchards, particularly when high trimming of trees is desired. The present invention is an agricultural trimming device, more particularly a circular saw head, that can be utilized as a boom head attachment for tractors used for right of way maintenance. The circular saw head itself has an outer blade that is exposed to reach limbs better. The blades are preferably 3/16 inch thick and 26 inches in diameter. The blades can cut as much as four inches of material. The head can also be reversible. Aprons are provided at a 45 degree angle to help deflect cut material down toward the ground and away from the operator. The blades are offset with overlap by the blades. This results in a clean cut with a manicured chainsaw look and fairly rapid production rate. This also provides a much safer blade system because the residue from the cutting process is relatively small. Applicant knows of no other circular saw head that incorporates the benefits of Applicant's invention. U.S. Pat. No. 3,138,911 issued to Pounds discloses a hedge trimmer for attachment to a tractor. However, Applicant's invention is an improvement over this previous invention because it incorporates protective shielding aprons. U.S. Pat. No. 4,815,263 issued to Hartung et al discloses an airborne tree trimmer apparatus and U.S. Pat. No. 5,501,257 issued to Hickman discloses a tree trimming apparatus. While these inventions have the same intent as the present invention, they are not related to the present invention.

SUMMARY OF THE INVENTION

It is an object of the present invention to provide a novel circular saw head that produces a clean cut.

It is another object of the present invention to provide a novel circular saw head that has a fairly rapid production rate.

Yet another object of the present invention is to provide a novel circular saw head that is safer.

Still another object of the present invention is to provide a novel circular saw head that produces relatively small thrown objects.

It is yet another object of the present invention to provide a novel circular saw head that incorporates a shielding means to deflect cut materials away from the operator when the circular saw is engaged into vegetation.

It is still another object of the present invention to provide a novel circular saw head that can cut as much as four inches of vegetation.

Another object of the present invention is to provide a novel circular saw head that incorporates a bumper means to keep the blades off the ground when the head is in certain positions.

It is yet another object of the present invention to provide a novel circular saw head that is reversible.

In satisfaction of these and related objectives, Applicant's present invention provides a circular saw head for cutting tree limbs which can be used as a boom mounted head attachment.

DETAILED DESCRIPTION OF THE PREFERRED EMBODIMENT

Figure 1:
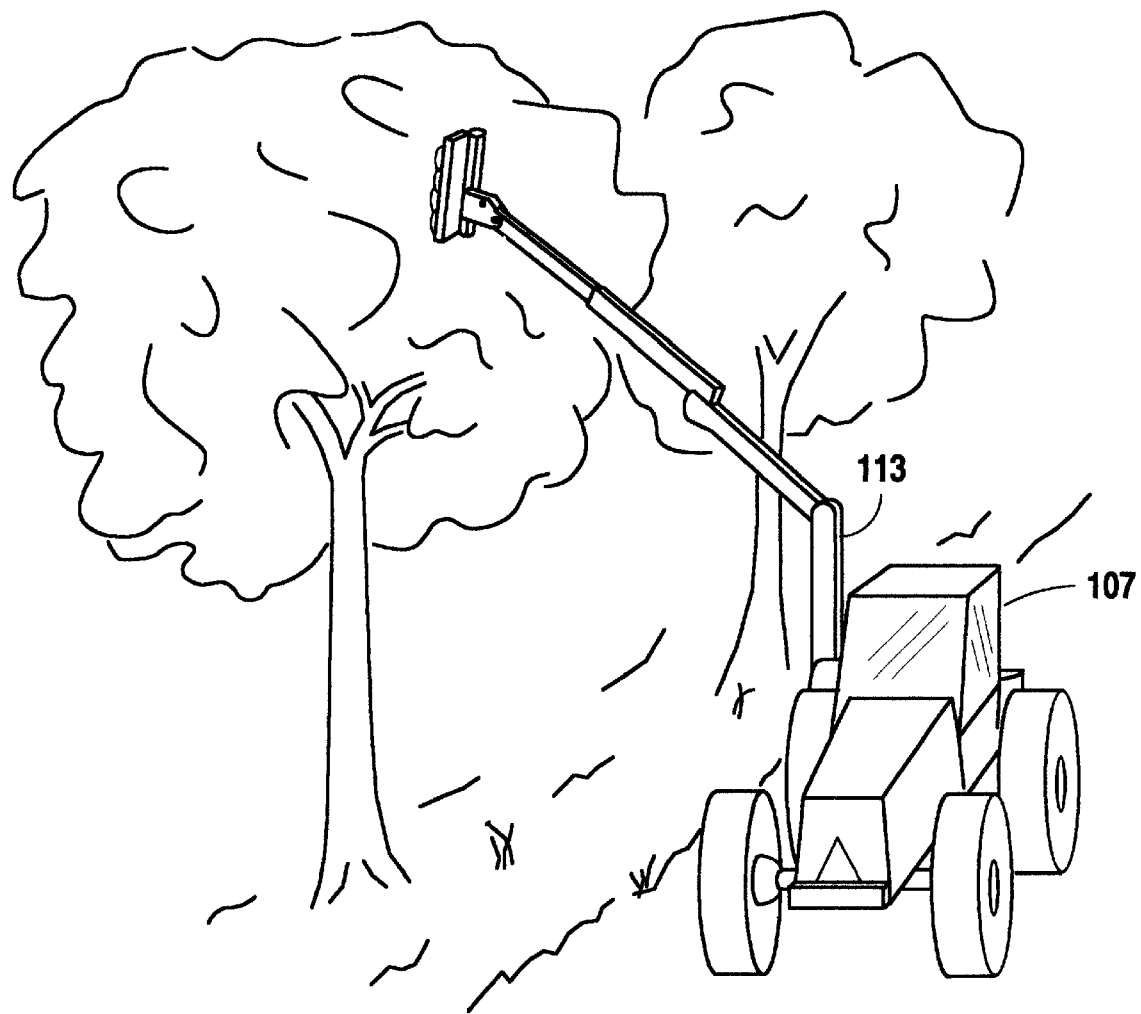
FIG. 1 is a perspective view of the preferred embodiment as it would be used.

Referring to FIG. 1, a perspective view of the preferred embodiment as it would be used is shown. A tractor with an outer boom arm 101 is shown attached to a boom head 111 containing circular saw blades 107.

Figure 2:
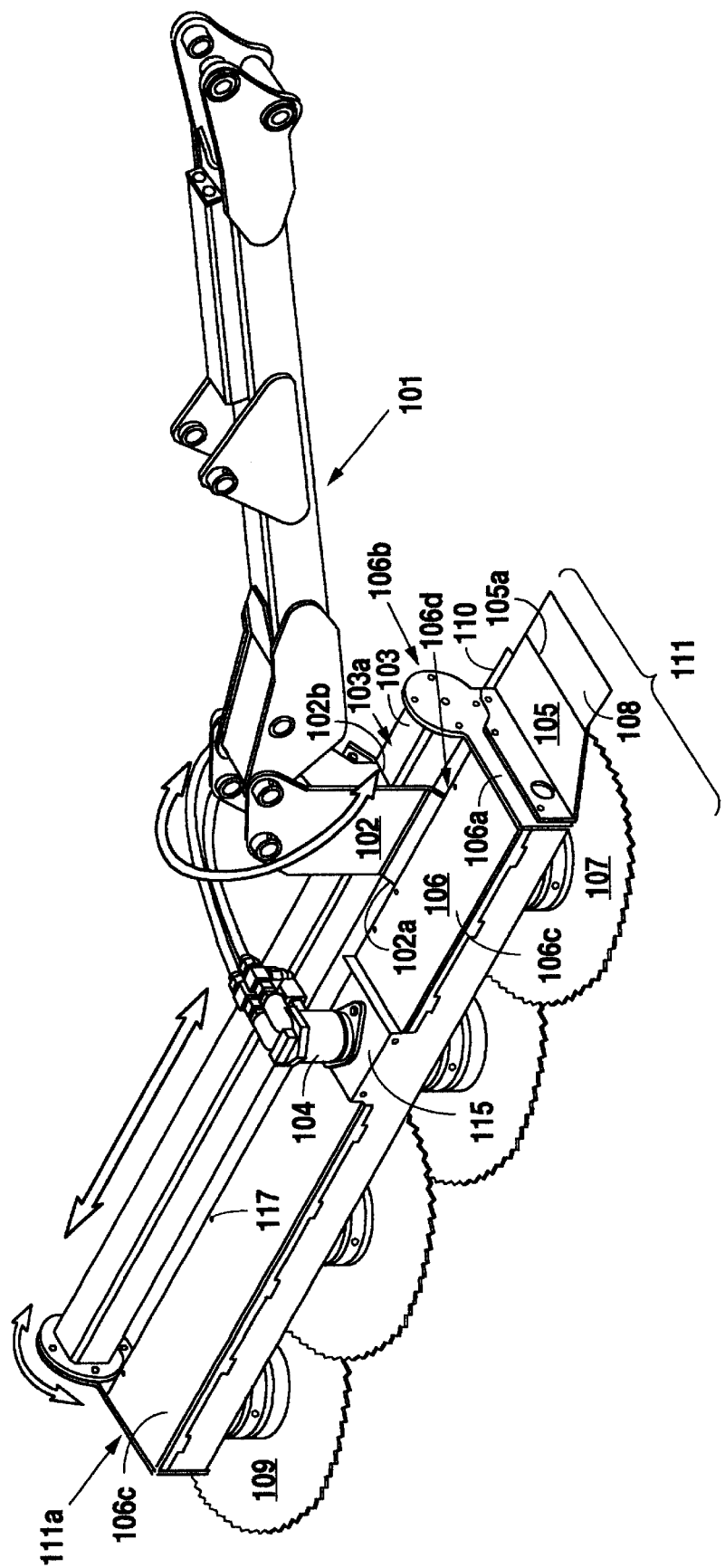
FIG. 2 is a perspective view of the preferred embodiment.

In FIG. 2, a perspective view of the preferred embodiment is shown. The boom head 111 is attached to a hitch post 102. The hitch post 102 is pivotally connected to the outer boom arm 101. An outer view of the boom head 111 shows a blade saw body 106 which houses at least one, preferably four, circular saw blades 107. The outer blade 109 is exposed so that it can reach a limb or other similar material on the outside end 111a of the boom head 111. In addition, the blades 107 are offset to allow for overlap which creates a constant cutting surface. It is preferred that the blades 107 be 3/16 inch thick and have a 26 inch diameter, but obvious modifications can be made to accommodate the specific use of the circular saw head. Any type of blade which imparts only a small amount or no recoil upon engaging a big load can be used. Chainsaw type blades or titanium carbide tipped blades can be used.

The back 106d of the blade saw body 106 acts as an anchor for a first attachment point 102a of the hitch post 102 and a top 103a of a tube 103 acts as a second attachment point 102b for the hitch post 102. The second attachment point 102b at the tube 103 can be pitched forward slightly. With additional holes, the tube 103 can be pitched at any desired angle.

There is a guard 105 at the side 106a of the blade saw body 106. Attached at the outer edge 105a of the guard 105 is a first apron 108. The guard 105 and first apron 108 can act as bumpers to keep the blades 107 out of the ground when the boom head 111 is in a certain position. A second apron 110 positioned at the rear 106b of the blade saw body 106 helps to deflect cut materials down rather than towards their original location. The angle of the second apron 110 is preferably 45 degrees downwards from the base of the rear 106b of the blade saw body 106; however any angle that helps to deflect the cut material can be used.

A hydraulic motor 104 is anchored above the blade saw body 106 on a motor mount plate 115, preferably centrally anchored, in the middle of a two piece belt cover 106c and serves as the power source to turn the blades 107. The belt cover 106c is held in place by quick release retainers with studs 117 and quick release receivers 118 (See FIG. 3).

Figure 3:
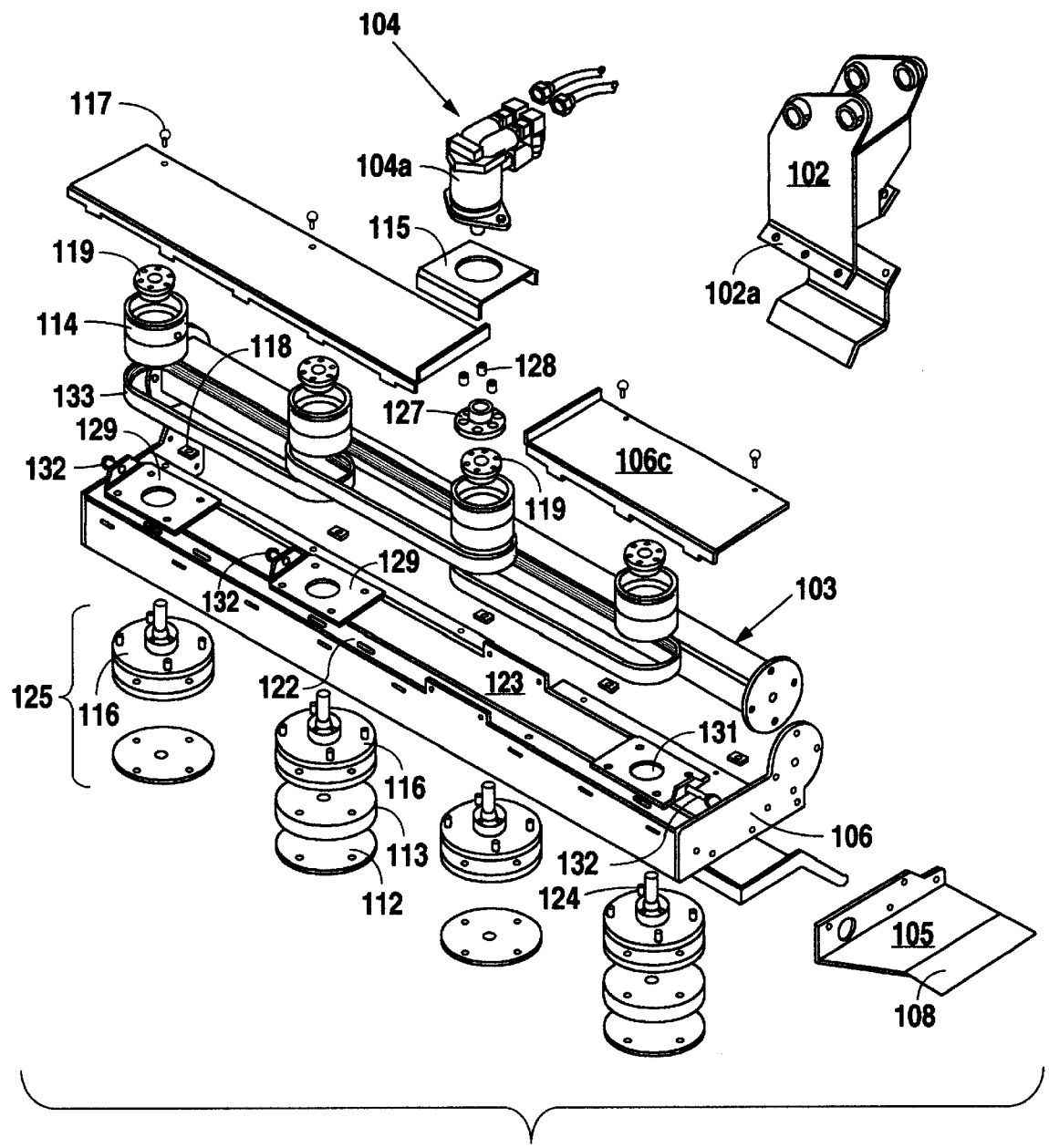
FIG. 3 is an exploded perspective view of the preferred embodiment.

FIG. 3 is an exploded perspective view of the preferred embodiment. Under the belt cover 106c, there is a belt 133 system that drives each individual spindle assembly 125. The blades 107 (See FIG. 2) are mounted to the spindle assembly 125.

More specifically, the blades 107 (See FIG. 2) are secured to the spindle assembly 125 with an end cap 112. A blade spacer 113 is inserted on the spindle assemblies 125 of alternating blades 107 (See FIG. 2). For example, in a mower head with four blades, the spacers would be placed on the spindle assemblies of blades 1 and 3. This allows for the blades 107 (See FIG. 2) to overlap to provide for a better cut when operating. At the uppermost portion of the spindle assembly 125 is a hub assembly 116.

There are slots (not shown) in a main channel 122 of the blade saw body 106 through which studs 124 on the spindle assembly 125 fit. A plate 123 attaches to the main channel 122 and has holes 131 which fit over the studs 124. Tension adjustment brackets 129 are placed on the plate 123. A tensioning bolt 132 on the side of the tension adjustment brackets 129 is used when the belt 133 system is in place to pull the belt 133, preferably a poly-v-belt, tight. The poly-v-belt is preferred in the present invention because it has a very small v-groove in the belt itself.

The hydraulic motor 104 more specifically the shaft 104$a$, is directly coupled to a pulley 114 through a flexible coupling 127 and bushing 119. Rubber grommets 128 contribute to the coupling's 127 flexibility.

While the preferred embodiments have discussed the present invention as it would be attached to different booms, the present invention could be used in other types of heads such as rotaries, flails, or needs associate with sickle bar mowers.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An agricultural trimming apparatus for use in trimming vegetation and for use on a tractor or the like comprising:
   a boom arm attached to said tractor;
   a boom head attached to said boom arm;
   a plurality of circular saw blades rotatably mounted to said boom head;
   a driving means housed within said boom head for driving said plurality of circular saw blades;
   a power source mounted to said boom head for engaging said driving means; and
   a shielding means attached to said boom head, wherein said shielding means is positioned so as to deflect cut vegetation away from an operator when said plurality of circular saw blades is engaged into said vegetation.

2. The agricultural trimming apparatus of claim 1 wherein said circular saw blades can cut as much as four inches of said vegetation.

3. The agricultural trimming apparatus of claim 2 wherein said circular saw blades are in a substantially staggered and overlapped relationship.

4. The agricultural trimming apparatus of claim 3 wherein said power source is a hydraulic motor.

5. The agricultural trimming apparatus of claim 4 wherein said circular saw blades are 26 inches in diameter.

6. The agricultural trimming apparatus of claim 5 wherein said circular saw blades are at least $3/16$ inches thick.

7. The agricultural trimming apparatus of claim 6 wherein said shielding means is positioned 45 degrees downward from said boom head.

8. The agricultural trimming apparatus of claim 7 further comprising a bumper means attached to said boom head to keep said circular saw blades off the ground when said apparatus is in certain positions.

9. The agricultural trimming apparatus of claim 8 wherein said boom head is reversible.

* * * * *

Disclaimer 6,311,746 — David J. Halvorson; Travis A. Anderson, both of Seguin, TX (US); CIRCULAR SAW HEAD. Patent dated Nov. 6, 2001. Disclaimer filed Sep. 3, 2002, by the assignee, Alamo Group Inc.

Hereby enters this disclaimer to claims 1-9, of said patent.

*(Official Gazette, May 13, 2003)*